(12) United States Patent
Dening et al.

(10) Patent No.: US 6,980,039 B1
(45) Date of Patent: Dec. 27, 2005

(54) DC-DC CONVERTER WITH NOISE SPREADING TO MEET SPECTRAL MASK REQUIREMENTS

(75) Inventors: David Dening, Stokesdale, NC (US); David E. Reed, Westminster, CO (US); Baker Scott, Boulder, CO (US)

(73) Assignee: RF Micro Devices, Inc., Greensboro, NC (US)

( * ) Notice: Subject to any disclaimer, the term of this patent is extended or adjusted under 35 U.S.C. 154(b) by 69 days.

(21) Appl. No.: 10/792,486

(22) Filed: Mar. 3, 2004

(51) Int. Cl.[7] ............................................. H03K 3/84
(52) U.S. Cl. ...................................... 327/164; 375/346
(58) Field of Search ........................ 327/164; 375/346, 375/303, 376

(56) References Cited

U.S. PATENT DOCUMENTS

| | | | |
|---|---|---|---|
| 5,608,353 A | 3/1997 | Pratt | 330/295 |
| 5,629,648 A | 5/1997 | Pratt | 330/289 |
| 5,808,453 A | 9/1998 | Lee et al. | 323/224 |
| 5,818,866 A * | 10/1998 | Wilk | 375/346 |
| 5,870,296 A | 2/1999 | Schaffer | 363/65 |
| 6,137,274 A | 10/2000 | Rajagopalan | 323/272 |
| 6,229,395 B1 | 5/2001 | Kay | 330/252 |
| 6,265,943 B1 | 7/2001 | Dening et al. | 330/296 |
| 6,271,727 B1 | 8/2001 | Schmukler | 330/284 |
| 6,285,239 B1 | 9/2001 | Iyer et al. | 327/531 |
| 6,307,364 B1 | 10/2001 | Augustine | 324/95 |
| 6,313,705 B1 | 11/2001 | Dening et al. | 330/276 |
| 6,329,809 B1 | 12/2001 | Dening et al. | 324/95 |
| 6,333,677 B1 | 12/2001 | Dening | 330/296 |
| 6,356,150 B1 | 3/2002 | Spears et al. | 330/145 |
| 6,369,656 B2 | 4/2002 | Dening et al. | 330/296 |
| 6,369,657 B2 | 4/2002 | Dening et al. | 330/296 |
| 6,384,433 B1 | 5/2002 | Barratt et al. | 257/197 |
| 6,385,276 B1 | 5/2002 | Hunt, Jr. et al. | 377/47 |
| 6,387,733 B1 | 5/2002 | Holyoak et al. | 438/123 |
| 6,392,487 B1 | 5/2002 | Alexanian | 330/254 |
| 6,404,287 B2 | 6/2002 | Dening et al. | 330/296 |
| 6,414,469 B1 | 7/2002 | Zhou et al. | 323/272 |
| 6,418,174 B1 | 7/2002 | Benedict | 375/303 |
| 6,448,831 B1 | 9/2002 | Hunt, Jr. et al. | 327/211 |
| 6,525,611 B1 | 2/2003 | Dening et al. | 330/298 |
| 6,528,983 B1 | 3/2003 | Augustine | 324/95 |
| 6,560,452 B1 | 5/2003 | Shealy | 455/333 |
| 6,566,963 B1 | 5/2003 | Yan et al. | 330/311 |
| RE38,140 E | 6/2003 | Schaffer | 363/65 |
| 6,606,489 B2 | 8/2003 | Razavi et al. | 455/323 |
| 6,701,138 B2 | 3/2004 | Epperson et al. | 455/127 |
| 6,710,664 B2 | 3/2004 | Humphreys et al. | 331/11 |
| 6,728,324 B1 | 4/2004 | Shan et al. | 375/346 |
| 6,731,145 B1 | 5/2004 | Humphreys et al. | 327/156 |
| 6,734,724 B1 | 5/2004 | Schell et al. | 330/10 |
| 2003/0054778 A1 | 3/2003 | Hecht | 455/115 |
| 2003/0133518 A1 | 7/2003 | Koomullil et al. | 375/326 |
| 2004/0183511 A1 | 9/2004 | Dening | 323/282 |

OTHER PUBLICATIONS

Yang, Ken, "Spread-Spectrum DC-DC Converter Combats EMI," Electronic Design, Nov. 5, 2001, pp. 86-88.

(Continued)

*Primary Examiner*—Shawn Riley
(74) *Attorney, Agent, or Firm*—Withrow & Terranova, PLLC (57) ABSTRACT

A DC—DC converter includes a variable frequency oscillator, a control system and a power train. The DC—DC converter is well suited for use in a cell phone. The control system uses the output of the oscillator to control the power train. The oscillator varies its frequency as a function of a pseudo random number generator, thereby reducing electromagnetic interference caused by ripple in the output of the DC—DC converter.

24 Claims, 8 Drawing Sheets

OTHER PUBLICATIONS

"Digital Cellular Telecommunications System (Phase 2+); Radio Transmission and Reception (GSM 05.05 Version 8.5.1 Release 1999)," ETSI EN 300 910 v8.5.1, Global System for Mobile Communications (GSM), 2000.

P. Asbeck, G. Hanington, P.F. Chen, and L.Larson, "Efficiency and Linearity Improvement in Power Amplifiers for Wireless Communications," University of California, San Diego, La Jolla, CA, IEEE 1998, pp. 15-18.

* cited by examiner

DC-DC CONVERTER WITH NOISE SPREADING TO MEET SPECTRAL MASK REQUIREMENTS

FIELD OF THE INVENTION

The present invention is related to a DC—DC converter and specifically a switching regulator DC—DC converter with an oscillator whose frequency changes to reduce electromagnetic interference.

BACKGROUND OF THE INVENTION

Mobile terminals such as cellular phones have become ubiquitous in modern society. Mobile terminals rely on sending an electromagnetic signal through the air to a base station and receiving electromagnetic signals through the air from the base station. An unfortunate side effect of the convenience of this wireless communication is that the signal-carrying electromagnetic radiation that forms the backbone of the communication may interfere with other electronic devices. This phenomenon is known as electromagnetic interference (EMI) or electromagnetic compatibility (EMC).

While interfering with other electronic devices like a computer or television is problematic, it is also possible for multiple mobile terminals operating in proximity to one another to have cross channel EMI. That is, one mobile terminal may be transmitting in a first channel, but some of the signal may spill over as noise into channels that are nearby in the frequency spectrum and on which a second mobile terminal is trying to operate. This spill over transmission is known by various terms, but is termed herein as "side band transmission."

To combat EMI in the United States, the FCC has promulgated standards for emissions that limit how much radiation may be radiated within certain frequency bands. On top of the FCC emissions rules, the various communication protocols used by mobile terminals may impose more restrictive limitations with specific attention paid to side band transmission levels. For example, Annex A of the GSM 05.05 version 8.5.1, released 1999, indicates that the maximum allowed signal for spurious side band signals is the larger of −60 dBc or −36 dBm. This measurement is to be averaged over at least two hundred transmit power cycles.

Against the backdrop of these standards, many mobile terminals incorporate DC—DC converters in their internal circuitry to change a DC voltage level of a battery to a lower or higher DC voltage level depending on the needs of the internal circuitry of the mobile terminal. A common method to implement a DC—DC converter uses a switching power supply that has a switch that opens and closes at a predetermined frequency according to a clock signal. Such switching power supplies exhibit a periodic ripple in their output at the switching frequency. If the DC—DC converter is used to provide a supply voltage (Vcc) to a saturated power amplifier, this ripple may mix with the radio frequency carrier to generate spurious side band signals.

To combat this ripple, manufacturers tend to use low drop-out linear regulators for power control associated with power amplifiers instead of the switching DC—DC converters. This substitution avoids the ripple issues, but does so at the expense of decreased efficiency and shorter battery life. Thus, there exists a need for a way to reduce spurs in a power amplifier's output while using an efficient switching power supply as a supply voltage for power amplifiers.

SUMMARY OF THE INVENTION

The present invention minimizes spurious emissions by spreading the frequency at which a variable oscillator in a switching power supply operates and flattening the spectrum of the spurious emissions. Specifically, the present invention represents a modification to a switching power supply that can be used in a myriad of mobile terminals, although it is especially well suited for use with Global System for Mobile Communications (GSM) compatible mobile terminals.

The present invention spreads the frequency of the oscillator, in a first embodiment, by providing a multi-bit shift register that outputs a pseudo random number, in effect forming a pseudo random number generator. This pseudo random number is provided to a pair of digital to analog converters (DACs). One DAC controls and turns on a variable current source such that a current is provided corresponding to the pseudo random number. The other DAC controls and turns on a variable current sink such that a current is drawn corresponding to the pseudo random number. One of the DACs also provides a control signal to a pseudo random number oscillator that provides a clock signal to the pseudo random number generator. The control signal for controlling the pseudo random number oscillator is the inverse of the control signal provided to the current source or current sink. Accordingly, the frequency of the output of the variable oscillator and the frequency of the output of the pseudo random number oscillator are inversely related.

A capacitor is selectively connected to either the current source or the current sink by a switch. When the capacitor is connected to the current source, the capacitor is charged. When the capacitor is connected to the current sink, the capacitor is discharged. The rate of charging and discharging is set by the current that flows as determined by the pseudo random number.

The voltage across the capacitor is measured by two comparators that determine if the voltage has risen above or fallen below predetermined set points. If the voltage has passed out of the range generated by the set points, one of the comparators will trigger a flip-flop causing a clock signal to be generated. This changes the position of the switch, causing the capacitor to switch from charge to discharge or vice versa. Thus, if the capacitor was charging and the voltage exceeded the set point, the flip-flop would be triggered and the switch would move so that the capacitor was connected to the current sink DAC. The capacitor then begins discharging until the comparator detects that the voltage is below the predefined set point and the flip-flop is triggered again.

Further, the clock signal from the flip-flop acts as the square wave for the switch in the power train portion of the DC—DC converter. This square wave may be modified by a control function in the DC—DC converter if needed or desired.

In a second embodiment, a single DAC and a single capacitor are used with current mirrors to reflect the current into the current source and current sink. This embodiment uses more current than the first embodiment, but has the advantage of taking up less space.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

Figure 1:
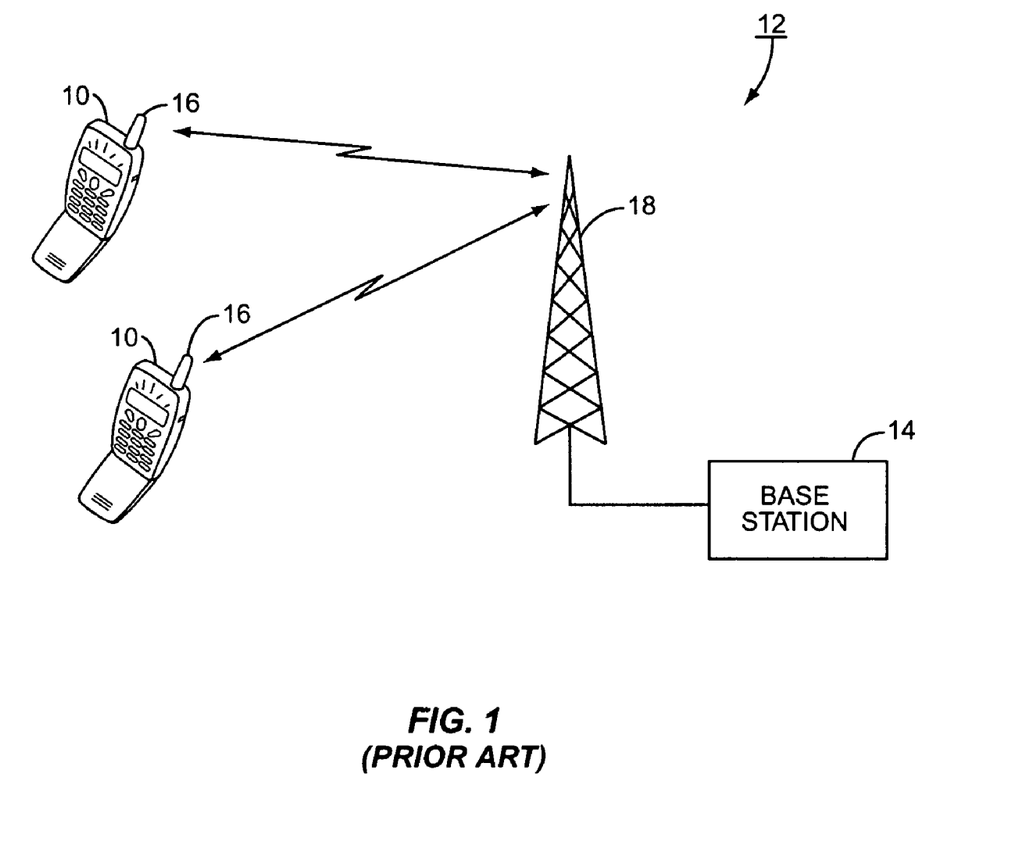
FIG. 1 illustrates a conventional exemplary communication system that may incorporate the present invention.

While the present invention could be used in myriad devices that use a switching power supply, the present invention is optimized to be used in a mobile terminal that operates according to the GSM protocol. For the purposes of illustrating the present invention, the following discussion will assume that a mobile terminal, such as mobile terminals 10 in FIG. 1 operate in a GSM communication environment 12. Thus, mobile terminals 10 communicate with base stations 14 through mobile terminal antennas 16 and base station antennas 18 as is well understood.

Figure 2:
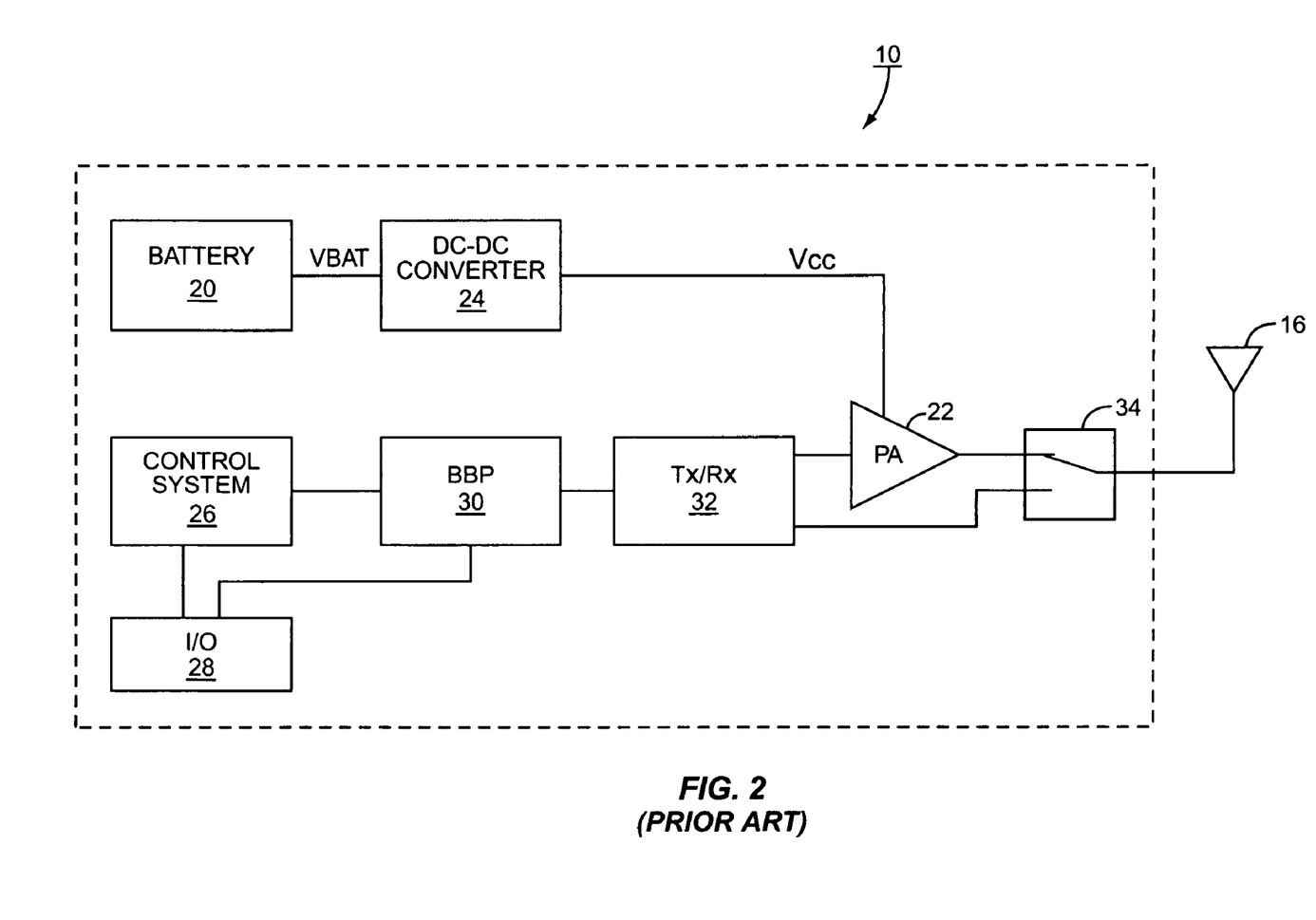
FIG. 2 illustrates a block diagram of a portion of the electronics within a typical mobile terminal.

A more detailed view of an exemplary mobile terminal 10 is presented in FIG. 2. The mobile terminal 10 comprises a battery 20 which powers the components of the mobile terminal 10 and in particular powers a power amplifier (PA) 22. Because the power amplifier 22 may not operate at the voltage level of the battery 20, a DC—DC converter 24 may be positioned between the battery 20 and the power amplifier 22 to convert the output of the battery (VBAT) to a suitable voltage (Vcc) for the power amplifier 22.

The power amplifier 22 is part of a transmitter chain within the mobile terminal 10. Specifically, the mobile terminal 10 may include a conventional control system 26 that controls an input/output (I/O) interface 28 that accepts user supplied inputs such as a voice signal and converts them to an electric signal for processing. The control system 26 passes the signal representative of the voice of the user to a baseband processor (BBP) 30 which performs preliminary processing steps on the signal to condition the signal for transmission. Alternatively, the BBP 30 may receive the signals directly from the input/output interface 28, as is well understood. The signal is then passed to a transceiver (Tx/Rx) 32 where the signal is converted to a radio frequency signal by mixing the signal with a carrier signal as is well understood. The radio frequency signal is then passed to the power amplifier 22 to boost the signal strength to a level appropriate for transmission. The boosted signal passes through a switch 34 and to the antenna 16 for transmission.

In the receive mode, the mobile terminal antenna 16 receives signals from the base station antenna 18 and passes the received signals through the switch 34 to the transceiver 32. The transceiver 32 converts the received signal from a radio frequency signal to a baseband signal before passing the baseband signal to the baseband processor 30 as is well understood.

As noted, in conventional mobile terminals 10, if the DC—DC converter 24 is a switching power supply, a ripple is present in the Vcc signal that passes from the DC—DC converter 24 to the power amplifier 22. This ripple shows up in the output of the power amplifier 22 as a spur in the frequency domain on either side of the carrier frequency. These spurs can appear in the neighboring channels causing unwanted interference.

Figure 3:
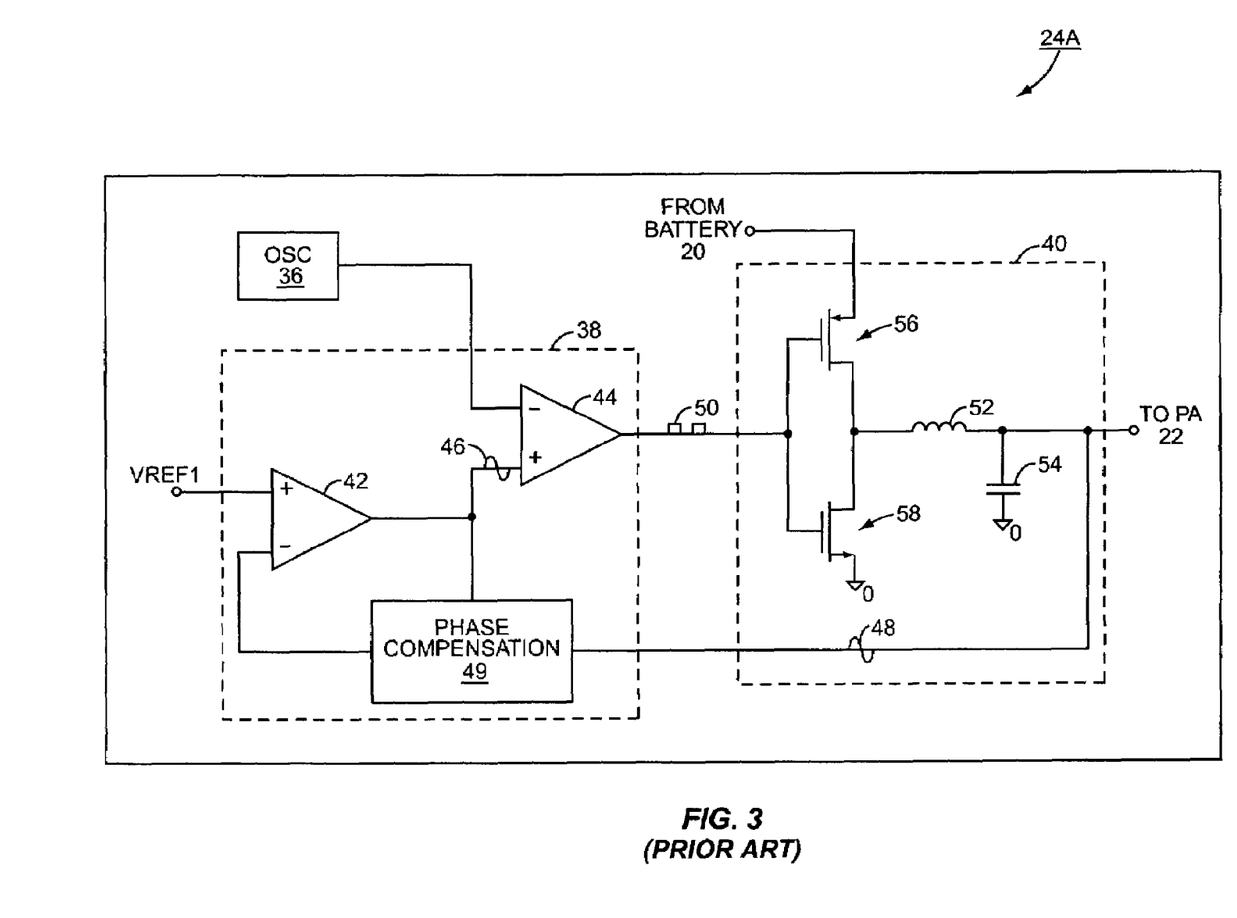
FIG. 3 illustrates a block diagram of a typical switching DC—DC converter.

A more detailed schematic of a typical DC—DC converter 24 is illustrated in FIG. 3. In particular, the DC—DC converter is, in the illustrated embodiment, a Buck converter 24A. The Buck converter 24A includes an oscillator (OSC) 36, a converter control system 38, and a power train 40. The converter control system 38 in this example includes an error amplifier 42 and a modulator 44. The oscillator 36 outputs a saw-tooth voltage waveform derived from the voltage on an internal capacitor (not illustrated). In the example, the saw-tooth wave form ramps up and ramps down. Other oscillators 36 may provide a ramp up followed by a rapid return. Regardless of the particular wave form, the voltage is fed to the modulator 44 where it is compared to an error voltage signal 46 from the error amplifier 42.

In the embodiment illustrated, the converter control system 38 operates according to a pulse width modulation scheme as is well understood, although other arrangements are possible and applicable to the present invention. Specifically, the error amplifier 42 of the converter control system 38 compares a feedback signal 48 to a voltage reference (VREF1) and generates the error voltage signal 46. The feedback signal 48 may be conditioned by phase compensation circuitry 49 for stability purposes. The error voltage signal 46 provides the threshold level used by the modulator 44 in processing the signal from the oscillator 36 to generate a signal 50. When the signal from the oscillator 36 is above the threshold determined by the error voltage signal 46, the signal 50 provided to the power train 40 is low. Conversely, when the signal 50 from the oscillator 36 is below the error voltage signal 46 threshold, the power train 40 receives a high signal. In general, the signal 50 driving the power train 40 is a square wave with a duty cycle determined by the level of the error voltage signal.

The power train 40 includes an inductor 52, a capacitor 54, plus two switches 56, 58. The switches 56, 58 are, in the illustrated embodiment, a p-channel FET and an N-channel FET respectively as is well understood for a typical buck topology. The square wave signal 50 turns the switches 56, 58 on and off. When the signal 50 is low, switch 56 is ON and switch 58 is OFF. This presents a voltage close to the voltage from the battery 20 to the inductor 52 causing an increase in current and storing energy in the inductor 52's magnetic field. Current is supplied to the power amplifier 22 and to the capacitor 54. When the signal 50 is high, switch 56 is OFF and switch 58 is ON. This connects the input of the inductor 52 to ground. As a result, the inductor 52 provides decreasing current to the power amplifier 22, while drawing energy from its magnetic field. As the output voltage drops, the capacitor 54 discharges and provides some of the load current.

The present invention lies in the oscillator 36 and is an improvement of the invention disclosed in U.S. patent application Ser. No. 10/389,849, which is incorporated herein by reference in its entirety. In general, U.S. patent application Ser. No. 10/389,849 discloses periodically varying the frequency at which the oscillator 36 operates thereby periodically changing the frequency of any ripple that appears in Vcc. Since the frequency of the ripple changes, the location in the frequency spectrum of the spurs changes. By moving the location of the spurs in the frequency spectrum, the energy at any given frequency is reduced, thereby helping meet the side band emissions requirements.

Figure 4:
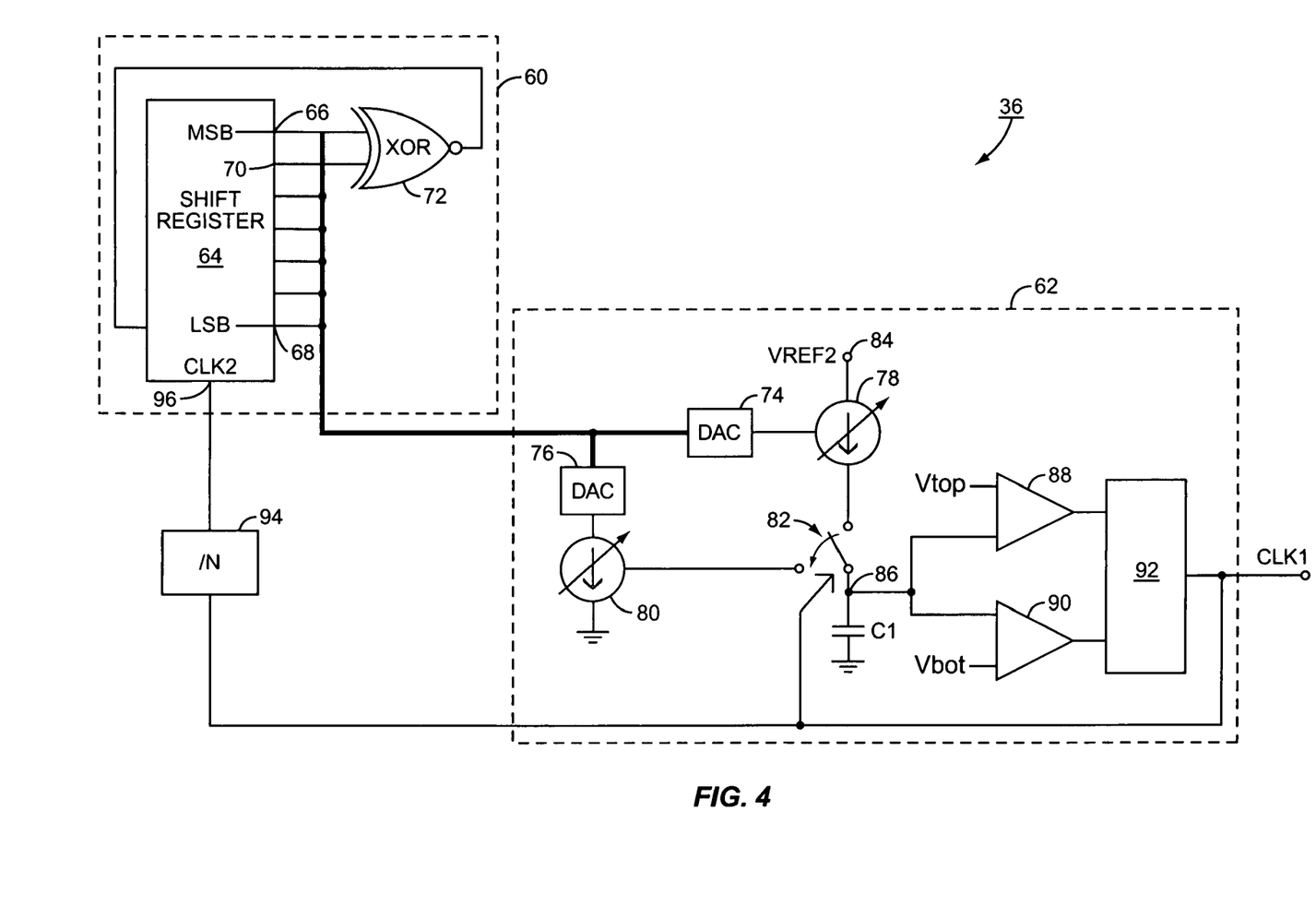
FIG. 4 illustrates a block diagram of an exemplary embodiment of an oscillator for a switching power supply, the frequency of the oscillator changing to reduce electromagnetic interference.

FIG. 4 illustrates one embodiment of the oscillator 36 disclosed in U.S. patent application Ser. No. 10/389,849. The oscillator 36 includes a pseudo random number generator 60 and a clock generation circuit 62. The pseudo random number generator 60 includes a seven bit shift register 64 with a most significant bit (MSB) output 66 and a least significant bit (LSB) output 68. Two outputs (which in the exemplary embodiment are the MSB output 66 and the next most significant bit output 70) are directed to an exclusive OR (XOR) gate 72. The output of the XOR gate 72 is fed back into an input of the shift register 64, thereby causing the shift register 64 to count in a pseudo random fashion and thus output a pseudo random number. This is known as a linear feedback shift register (LFSR) and is well known in the art. Other pseudo random number generators 60 could also be used if needed or desired. Likewise, the number of bits in the shift register may vary from embodiment to embodiment as needed or desired.

In addition to the outputs sent to the XOR gate 72, the outputs collectively are sent to the clock generation circuit 62. The clock generation circuit 62 includes a first digital to analog converter (DAC) 74 and a second digital to analog converter (DAC) 76. The DACs 74, 76 translate the digital signal from the pseudo random number generator 60 into an analog setting that controls variable current sources 78, 80 respectively. That is, the amount of current that flows through the current sources 78, 80 is varied by the DACs 74, 76. The current sources 78, 80 are selectively connected to a capacitor C1 by a switch 82. The first current source 78 is connected to a reference voltage supply (VREF2) 84 and thus provides current to the capacitor C1 when connected thereto, while the second current source 80 is connected to ground and thus acts as a current sink for the capacitor C1 when connected thereto. When the switch 82 is connected to the first current source 78, the capacitor C1 charges. When the switch 82 is connected to the second current source 80, the capacitor C1 discharges.

As capacitor C1 charges and discharges, a voltage is present at node 86 corresponding to the charge on the capacitor C1. The voltage at node 86 has a saw tooth voltage waveform due to the current that flows into and out of the capacitor C1. This voltage at node 86 is presented to comparators 88, 90. First comparator 88 compares the voltage at node 86 to a predefined voltage level Vtop, and second comparator 90 compares the voltage at node 86 to a predefined voltage level Vbot. If the voltage at node 86 exceeds Vtop, the first comparator 88 sends a signal to a flip-flop 92. If the voltage at node 86 dips below Vbot, the second comparator 90 sends a signal to the flip-flop 92.

The act of sending a signal to the flip-flop 92 from either comparator 88 or 90 causes a clock pulse (CLK1) to be output by the flip-flop 92. This clock pulse controls the switch 82 and is further directed to a divide by N element (/N) 94. The divide by N element 94 may have a counter which counts the pulses received in CLK1 and determines if N pulses have been received. Once N pulses have been received, the divide by N element 94 outputs a pulse (CLK2) which is received by the shift register 64 at clock input (CLK2) 96. Thus, the divide by N element 94 effectively divides CLK1 by N to arrive at CLK2. The receipt of the CLK2 signal causes the shift register to perform a "count" and change the pseudo random number being output.

A signal derived from the capacitor voltage 86 is sent from the oscillator 36 to the converter control system 38 as needed or determined by the converter control system 38.

Figure 5:
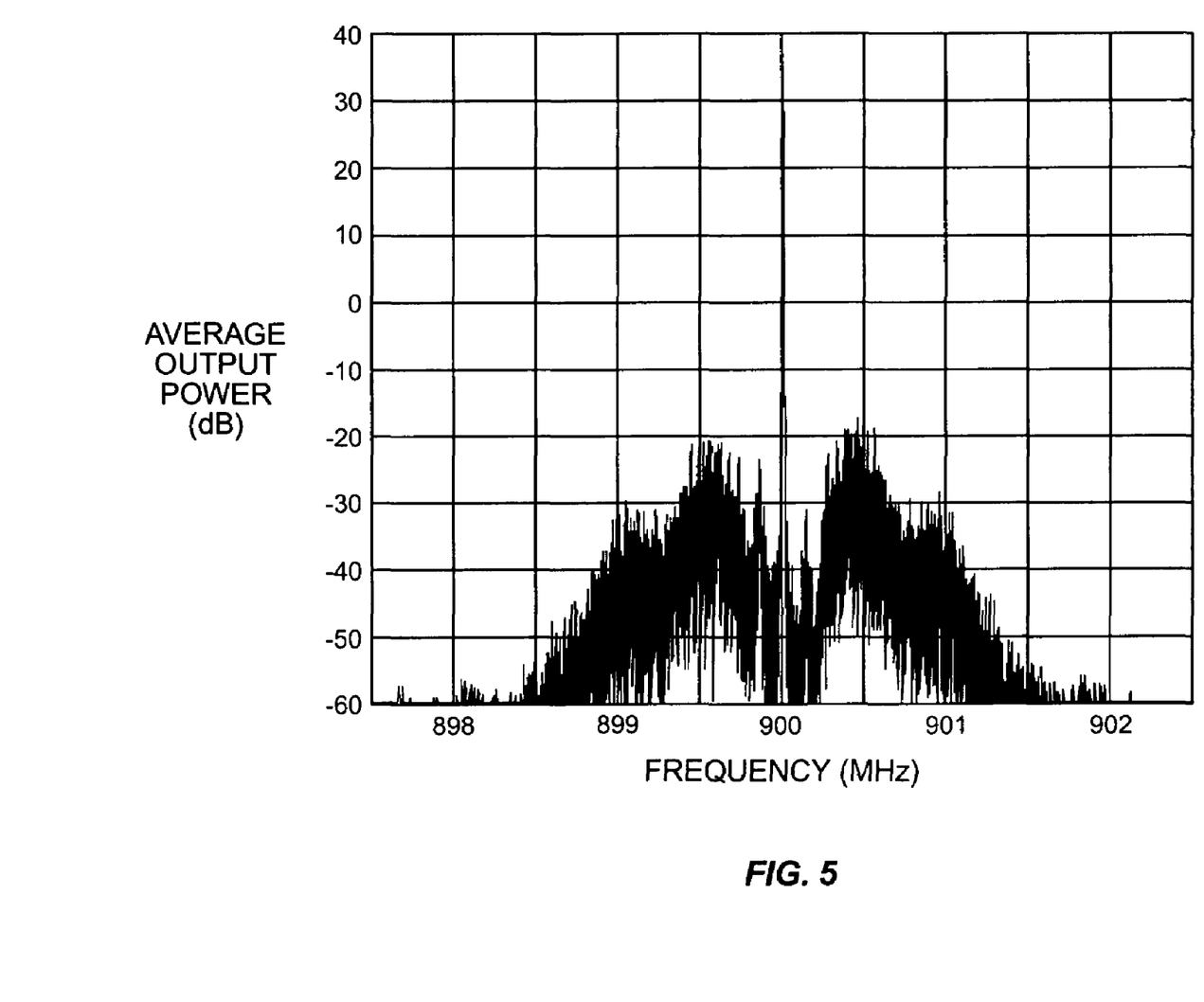
FIG. 5 is a graphical illustration of variable frequency spurs from the switching power supply including the oscillator of FIG. 4 modulated onto a carrier signal.

FIG. 5 illustrates the frequency spectrum of the output of the power amplifier 22 (FIG. 2) having a supply voltage provided by the DC—DC converter 24 including the oscillator 36 of FIG. 4. For this example, the carrier signal is a 900 MHz carrier signal and N for the divide by N element 94 is four. Thus, the CLK2 is CLK1 divided by four.

In general, spurs caused by lower CLK1 frequencies are closer to the carrier frequency, and spurs caused by higher CLK1 frequencies are further from the carrier frequency. The noise very close in to the carrier signal is transient noise from the switched power supply caused by the settling of the output voltage and control loops after CLK1 changes. As illustrated, the spurs caused by lower CLK1 frequencies are larger than the spurs caused by higher CLK1 frequencies. One cause of this is that the ripple voltage at the output of the inductor 52 and capacitor 54 (FIG. 3) is larger for lower frequencies than for higher frequencies. Another cause for larger spurs caused by lower CLK1 frequencies is the fact that the divide by N element 94 causes the oscillator 36 to spend more time operating at lower frequencies than at higher frequencies. Thus, over time, the average magnitudes of spurs caused by lower CLK1 frequencies are larger than the average magnitudes of spurs caused by higher CLK1 frequencies. For example, if N=4, the time period for four clock cycles when CLK1 is 1 MHz is longer than the time period for four clock cycles when CLK1 is 2 MHz. Thus, for this example, the average magnitudes of the spurs at 899 MHz and 901 MHz are larger than the average magnitude of the spurs at 898 MHz and 902 MHz.

Figure 6:
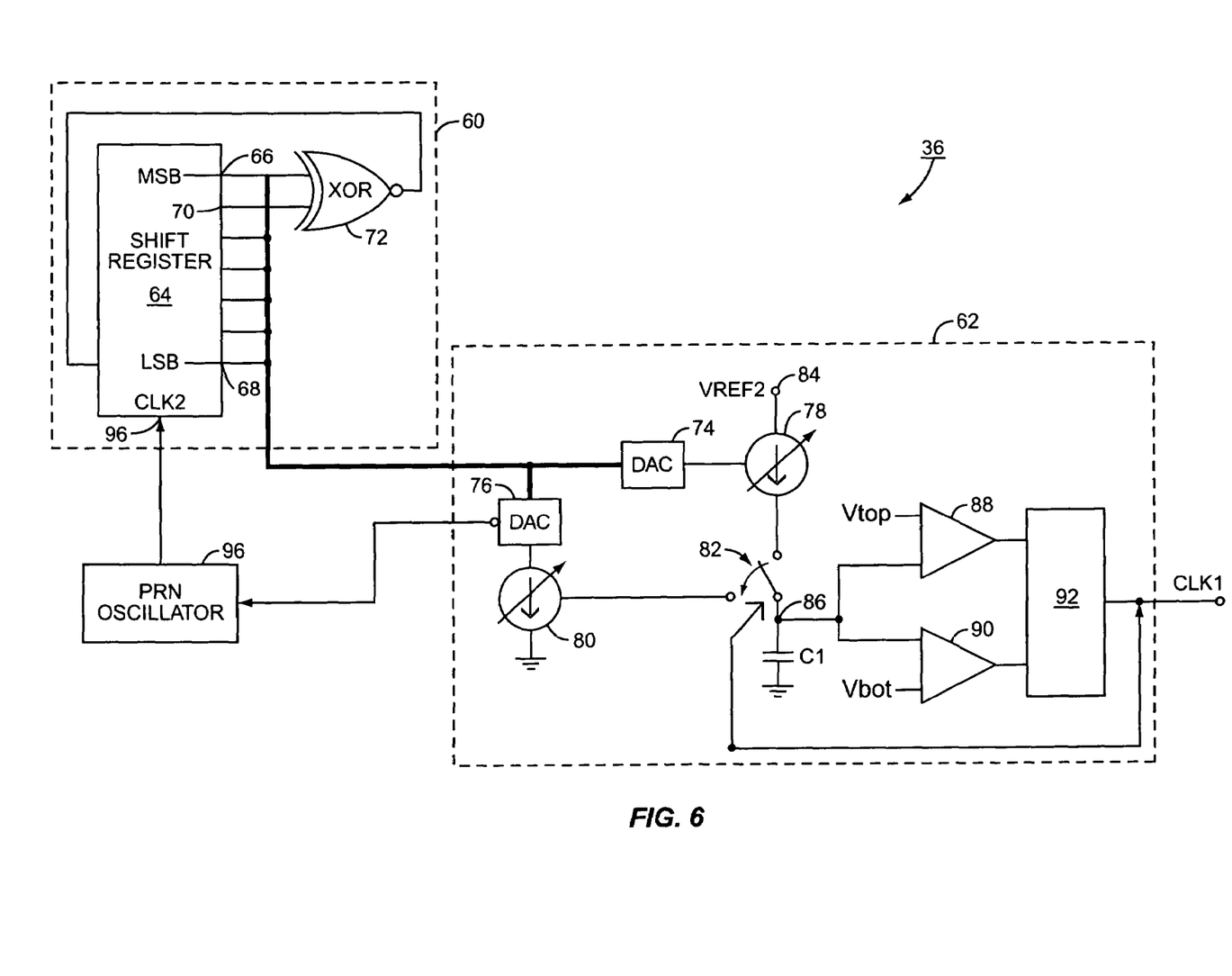
FIG. 6 illustrates a block diagram of a first exemplary embodiment of an improved oscillator for switching power supply according to the present invention.
Figure 7:
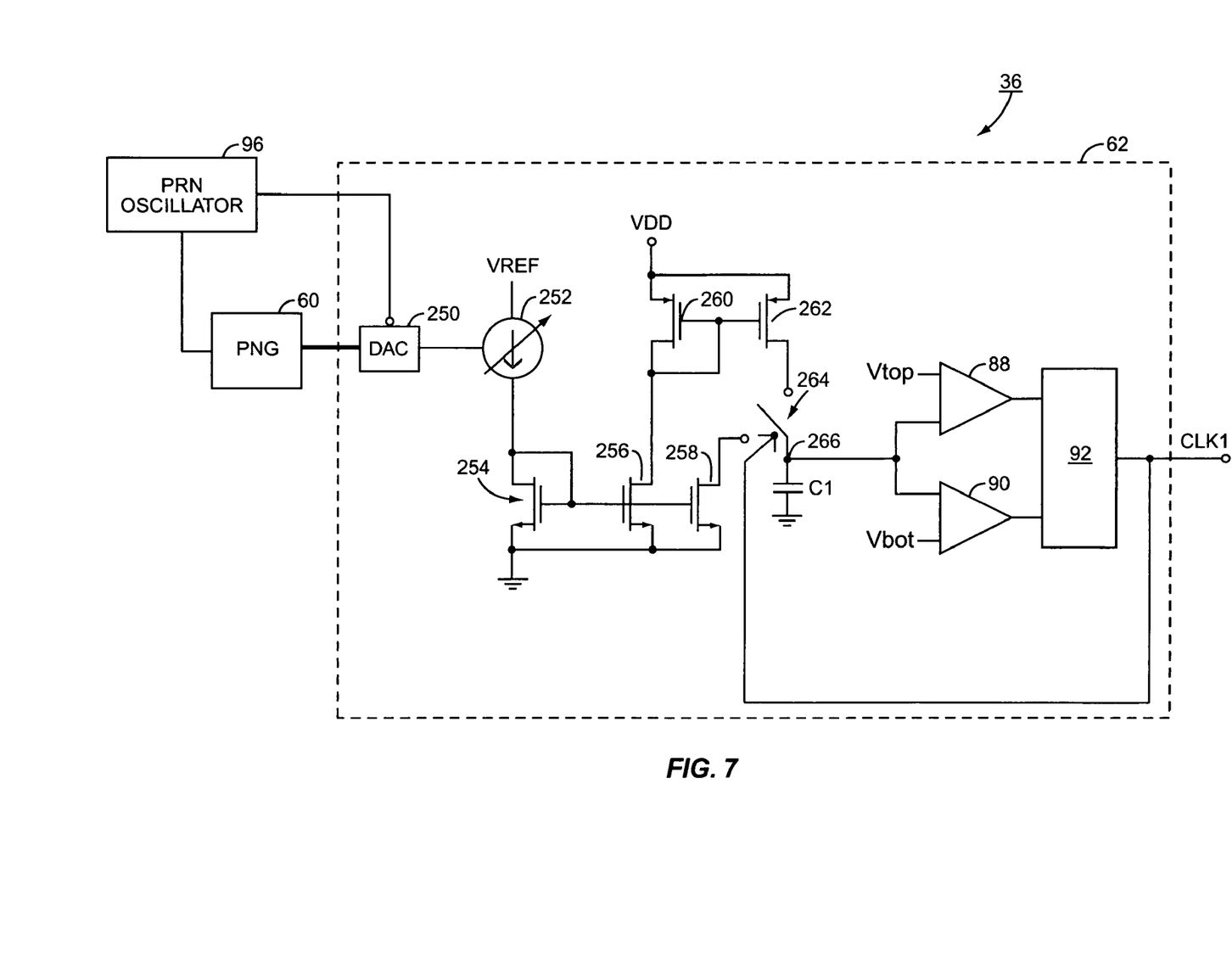
FIG. 7 illustrates a block diagram of a second exemplary embodiment of the improved oscillator for a switching power supply of the present invention.

The present invention is an improvement of the oscillator 36 of FIG. 4 and is illustrated in FIGS. 6 and 7. In general, the oscillator of the present invention operates to flatten the spurious spectrum of FIG. 5. More specifically, the oscillator 36 of the present invention provides a first clock signal having a variable frequency. The frequency of the first clock signal is randomly selected, and the frequency of the first clock signal changes at a second frequency that is inversely related to the frequency of the first clock signal, thereby flattening the spurious spectrum of FIG. 5. In doing so, the magnitudes of spurs closer to the center frequency are reduced and the magnitudes of spurs further from the center frequencies are increased such that the spurious spectrum is substantially flat, thereby having an overall effect of reducing the overall maximum spur level in the frequency spectrum.

A first embodiment of the oscillator 36 of the present invention is illustrated in FIG. 6. Similarly to the oscillator 36 of FIG. 4, the oscillator 36 includes the pseudo random number generator 60 and the clock generation circuit 62. The pseudo random number generator 60 includes the seven bit shift register 64 and the exclusive OR (XOR) gate 72 operating such that the shift register 64 counts in a pseudo random fashion and thus outputs a pseudo random number. Other pseudo random number generators 60 could also be used if needed or desired. Likewise, the number of bits in the shift register may vary from embodiment to embodiment as needed or desired.

The outputs of the pseudo random number generator 60 are collectively sent to the clock generation circuit 62. The DACs 74, 76 translate the digital signal from the pseudo random number generator 60 into an analog current control signal that controls the variable current sources 78, 80 respectively. The current sources 78, 80 are selectively connected to the capacitor C1 by the switch 82 such that the capacitor C1 charges when the switch 82 is connected to the first current source 78, and the capacitor C1 discharges when the switch 82 is connected to the second current source.

The first comparator 88 compares the voltage at node 86 to the predefined voltage level Vtop and the second comparator 90 compares the voltage at node 86 to the predefined voltage level Vbot. If the voltage at node 86 exceeds Vtop, the first comparator 88 sends a signal to the flip-flop 92. If the voltage at node 86 dips below Vbot, the second comparator 90 sends a signal to the flip-flop 92. Based on the outputs of the comparators 88 and 90, the flip-flop 92 produces the clock signal CLK1.

According to the present invention, the oscillator 36 of FIG. 6 further includes a pseudo random number (PRN) oscillator 96 that generates the clock signal CLK2 for the shift register 64 of the pseudo random number generator 60 based on an oscillator control signal from the DAC 76. The oscillator control signal is an inverted output of the DAC 76. The oscillator control signal is the inverse of the analog current control signal from the DAC 76. As used herein, "inverse" means that as one signal increases the other decreases and vice versa. In general, the oscillator control signal is equivalent to a maximum output of the DAC 76 minus the current corresponding to the current control signal. For example, in one embodiment, the current control signal and the oscillator control signal are both currents, and the oscillator control signal is essentially a maximum output current of the DAC 76 minus the current corresponding to the current control signal. Consequently, when the clock generation circuitry 62 is operating at the high end of its frequency range, the PRN oscillator 96 is operating at the low end of its frequency range, and vice versa. Thus, the oscillator 36 spends more time generating higher frequencies than lower frequencies. In doing so, the oscillator 36 operates to reduce the average ripple voltage at the output of the inductor 52 and capacitor 54 (FIG. 3) at lower CLK1 frequencies, thereby flattening the spurious response illustrated in FIG. 5.

In an exemplary embodiment, the PRN oscillator 96 is similar to the clock generation circuitry 62 without the DACs 74 and 76. However, the PRN oscillator 96 may be any controllable oscillator.

A second embodiment of the oscillator 36 of the present invention is illustrated in FIG. 7. The PNG 60 outputs a pseudo random number to a DAC 250 that in turn controls a variable current source 252 via an analog current control signal and further controls the frequency of the PRN oscillator 96 via an oscillator control signal. The current control signal is from a non-inverting output of the DAC 250, and the oscillator control signal is from an inverting output of the DAC 250. Therefore, the oscillator control signal is the inverse of the current control signal provided to the variable current source 252. Accordingly, when the clock generation circuitry 62 is operating at the high end of its frequency range, the PRN oscillator 96 is operating at the low end of its frequency range, and vice versa. Thus, the oscillator 36 spends more time generating higher frequencies than lower frequencies. In doing so, the oscillator 36 operates to flatten the spurious response illustrated in FIG. 5.

In operation, the variable current source 252 outputs a current that is mirrored from a first Field Effect Transistor (FET) 254 to a second FET 256 and a third FET 258. The current mirrored into the second FET 256 forces a current to exist in a fourth FET 260. The current in the fourth FET 260 is mirrored into a fifth FET 262. While FETs are illustrated, other current mirroring mechanisms could also be used. The third FET 258 acts as a current sink and the fifth FET 262 acts as a current source for the capacitor C1 depending on the position of the switch 264. This embodiment has the advantage of taking up less space in a semiconductor than the two DAC arrangement of FIG. 4, but at the expense of wasted current.

The comparators 88, 90 measure the voltage at node 266 and set and reset the flip-flop 92 much as previously described. The flip-flop 92 generates a CLK1 signal, whose pulses control the switch 264. The saw-tooth signal on the capacitor C1 at node 266 may be used by the modulator 44 (FIG. 3) as previously explained.

Figure 8:
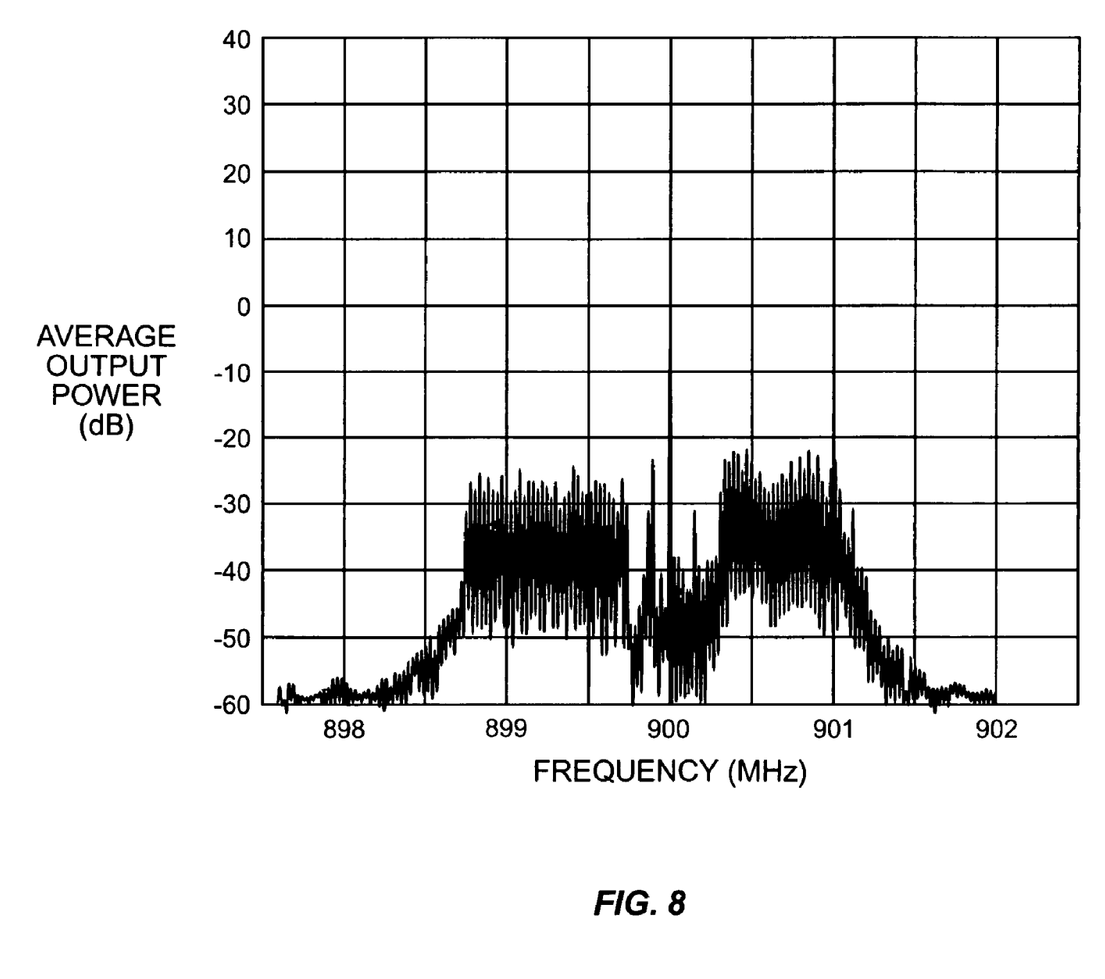
FIG. 8 is a graphical illustration of variable frequency spurs from the switching power supply including the improved oscillator of FIGS. 5 and 6 modulated onto a carrier signal.

FIG. 8 illustrates an exemplary frequency spectrum of the output of the power amplifier 22 (FIG. 2) having a supply voltage provided by the DC—DC converter 24 including the oscillator 36 of FIG. 6 or FIG. 7. As compared to FIG. 5, the frequency spectrum illustrated in FIG. 8 is substantially flattened. The spurs occurring around 899.5 MHz and 900.5 MHz have decreased and the spurs occurring around 899 MHz and 901 MHz have increased. Further, the magnitudes of the maximum spurs, which occur at about 899.5 MHz and 900.5 MHz have been reduced as compared to FIG. 5. In this example, the magnitudes of the spurs occurring at about 899.5 MHz and 900.5 MHz have been reduced by approximately 5–10 dB.

The present invention provides substantial opportunity for variation without departing from the spirit or scope of the present invention. For example, while comparators 88, 90 are used throughout the exemplary embodiments, it is also possible to use inverter gates therefore. The ratio of the top and bottom transistor size may be skewed to change the logic threshold. As another example, FIGS. 6 and 7 illustrate two exemplary embodiments of the clock generation circuitry 62. However, it should be noted that the illustrated embodiments are exemplary rather than limiting. As yet another example, although FIG. 6 illustrates the DAC 76 providing the inverted output to the PRN oscillator 96, either of the DACs 74 or 76 may provide the oscillator control signal to the PRN oscillator 96. As yet another example, FIGS. 6 and 7 illustrate the oscillator control signal as the inverted output of the DAC 76 and 250, respectively. However, in an alternative embodiment, the oscillator control signal may be the non-inverted output of the DAC's and the current control signal may be the inverted output of the DAC's 74, 76, and 250.

Those skilled in the art will recognize improvements and modifications to the preferred embodiments of the present invention. All such improvements and modifications are considered within the scope of the concepts disclosed herein and the claims that follow.

What is claimed is:

1. A DC—DC switching power supply, comprising:
a power train;
a variable frequency oscillator comprising:
clock generation circuitry adapted to generate a first clock signal; and
circuitry adapted to control the clock generation circuitry such that a frequency of the first clock signal is randomly selected and the frequency of the first clock signal changes at a second frequency that is inversely related to the frequency of the first clock signal; and
a control system adapted to control the power train as a function of the first clock signal.

2. The DC—DC switching power supply of claim 1 wherein the circuitry comprises:
a pseudo random number generator adapted to generate a pseudo random number in response to a second clock signal having the second frequency; and
a variable pseudo random number oscillator adapted to provide the second clock signal based on an oscillator control signal;
the clock generation circuitry further adapted to provide the first clock signal and the oscillator control signal based on the pseudo random number.

3. The DC—DC switching power supply of claim 2 wherein clock generation circuitry is further adapted to provide the oscillator control signal such that the second frequency of the second clock signal is inversely related to the frequency of the first clock signal.

4. The DC—DC switching power supply of claim 2 wherein the clock generation circuitry comprises a digital to analog converter adapted to generate the oscillator control signal and a current control signal as a function of the pseudo random number.

5. The DC—DC switching power supply of claim 4 wherein the digital to analog converter is further adapted to provide the oscillator control signal and the current control signal such that the oscillator control signal is inversely related to the current control signal.

6. The DC—DC switching power supply of claim 4 wherein the digital to analog converter further comprises a non-inverted output providing the current control signal and an inverted output providing the oscillator control signal.

7. The DC—DC switching power supply of claim 4 wherein the clock generation circuitry further comprises a capacitor adapted to charge and discharge as a function of the current control signal.

8. The DC—DC switching power supply of claim 7 wherein said variable frequency oscillator further comprises a plurality of current mirrors adapted to create a current sink and a current source so that the capacitor may charge and discharge.

9. The DC—DC switching power supply of claim 7 wherein the clock generation circuitry further comprises a second digital to analog converter adapted to generate a second current control signal as a function of the pseudo random number, the digital to analog converter and the second digital to analog converter adapted to receive the pseudo random number and set a current level for charging and discharging the capacitor as a function of the pseudo random number.

10. The DC—DC switching power supply of claim 9 wherein the clock generation circuitry further comprises a first current source adapted to charge the capacitor as a function of the current control signal.

11. The DC—DC switching power supply of claim 10 wherein the clock generation circuitry further comprises a second current source adapted to discharge the capacitor as a function of the second current control signal.

12. The DC—DC switching power supply of claim 1 wherein said switching power supply comprises a buck converter.

13. The DC—DC switching power supply of claim 1 wherein said switching power supply comprises a boost converter.

14. The DC—DC switching power supply of claim 1 wherein the control system selectively gates the first clock signal from the variable frequency oscillator to the power train.

15. The DC—DC switching power supply of claim 1 wherein the power train is adapted to provide an output voltage based on a control signal from the control system.

16. A method of operating a DC—DC converter comprising:
generating a first clock signal having a variable frequency such that a frequency of the first clock signal is randomly selected and the frequency of the first clock signal changes at a second frequency that is inversely related to the frequency of the first clock signal; and
controlling a power train as a function of the first clock signal.

17. The method of claim 16 wherein generating the first clock signal comprises:
generating the first clock signal and an oscillator control signal based on a pseudo random number;
generating the pseudo random number in response to a second clock signal having the second frequency; and
generating the second clock signal based on the oscillator control signal.

18. The method of claim 17 wherein generating the first clock signal and the oscillator control signal further comprises generating the oscillator control signal such that a frequency of the second clock signal is inversely related to a frequency of the first clock signal.

19. The method of claim 17 wherein generating the first clock signal and the oscillator control signal further comprises digitizing the pseudo random number with a digital to analog converter having an inverted output and a non-inverted output to provide the oscillator control signal and a current control signal such that the oscillator control signal is inversely related to the current control signal.

20. The method of claim 19 wherein generating the first clock signal and the oscillator control signal further comprises charging and discharging a capacitor as a function of the current control signal.

21. The method of claim 16 wherein controlling the power train as a function of the first clock signal comprises selectively gating the first clock signal to the power train.

22. The method of claim 17 wherein generating the first clock signal and the oscillator control signal further comprises digitizing the pseudo random number with a pair of digital to analog converters providing current control signals to corresponding current sources used to charge and discharge a capacitor.

23. The method of claim 17 wherein generating the first clock signal and the oscillator control signal further comprises digitizing the pseudo random number with a pair of digital to analog converters providing current control signals to corresponding current sources used to charge and discharge a capacitor, at least one of the pair of digital to analog converters having an inverted output and a non-inverted output to provide the oscillator control signal and the current control signal such that the oscillator control signal is inversely related to the current control signal.

24. The method of claim 17 wherein generating the first clock signal and the oscillator control signal further comprises using the pseudo random number to set a current level and mirroring the current through a plurality of current mirrors.

* * * * *